G. F. KRIEGER.
CARPENTER'S WORK SUPPORT.
APPLICATION FILED AUG. 12, 1916.

1,243,532.

Patented Oct. 16, 1917.

Georg F. Krieger
Inventor

By Geo. P. Kimmel
Attorney

UNITED STATES PATENT OFFICE.

GEORG F. KRIEGER, OF GRAND RAPIDS, WISCONSIN.

CARPENTER'S WORK-SUPPORT.

1,243,532.   Specification of Letters Patent.   Patented Oct. 16, 1917.

Application filed August 12, 1916. Serial No. 114,581.

*To all whom it may concern:*

Be it known that I, GEORG F. KRIEGER, a citizen of the United States, and resident of Grand Rapids, in the county of Wood and State of Wisconsin, have invented certain new and useful Improvements in Carpenters' Work-Supports, of which the following is a specification.

The present invention relates to new and useful improvements in collapsible supports for carpentry work and for the use of mechanics, the same having particular reference to that class of devices known as carpenters' "horses."

The primary object of my invention is to provide a carpenter's horse having means associated therewith for connecting the supporting beam and legs.

Another object of my invention is to provide improved means for connecting the beam and supporting legs of a carpenter's horse or the like, whereby said legs and beam may be readily disconnected to renew the beam or one of the legs as the case may be. Of course, as will appear from the following detail description, I do not limit myself to the use of the device for connecting beams and supporting legs, since by increasing the size of the yoke and connecting elements the same may be employed for various kinds of structural work.

A further object of my invention is to provide a device of the class described which may be cheap to manufacture, strong and durable, and effective in operation.

Other objects and advantages to be derived from the use of my improved carpenter's horse will appear from the following detail description and the claims, taken with an inspection of the accompanying drawing, in which:

Figure 1:
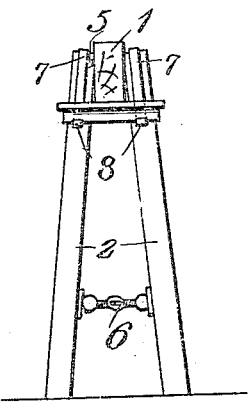
Figure 1 is an end elevational view assembled, of a carpenter's horse embodying the improvements of my invention.

Referring more particularly to the drawing, wherein similar characters of reference designate like and corresponding parts throughout the various views, 1 designates the beam of the usual horse and 2 and 3 designate the supporting legs thereof.

Figure 2:
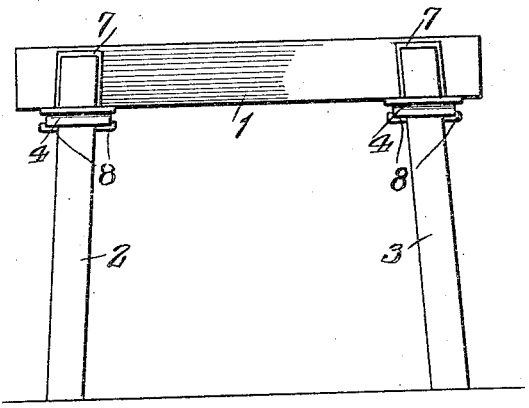
Fig. 2 is a side elevational view of the same.
Figure 3:
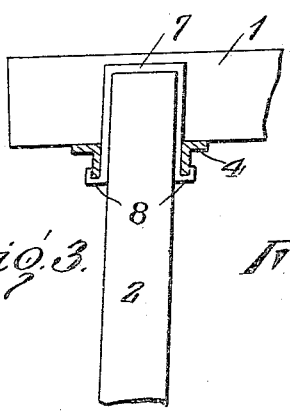
Fig. 3 is an enlarged fragmentary sectional view of the connecting elements.

My invention resides specifically in the yoke member for connecting the beam and legs 2 and 3, the preferred form of the same being shown in Figs. 1 to 3.

Referring to the form of my invention shown in Figs. 1 to 3, I provide a rectangular yoke member 4 formed of angle-iron adapted to embrace a pair of legs 2 and 3 as the case may be. The upper free ends of the legs 2 and 3 are beveled as at 5 to engage the opposite faces of the beam 1, said legs being relatively divergent. A screw spreading clamp 6 is inserted between the legs 2 and 3 adjacent the lower ends thereof for an obvious purpose.

For maintaining each of the yoke members 4 in position on their respective legs I provide, with each yoke member a pair of strap members 7, said strap members being bent to conform to the shape of the upper end of the legs to which the same are applied, the lower free ends of the strap members being formed with stirrups 8 for engagement beneath the yoke member 4.

It will be seen that when the yoke members and stirrup members are applied to the beam and legs as best shown in Figs. 1 to 3, and the clamp member 6 tightened, the legs will be caused to grip the beam preventing withdrawal of the same, the yoke member being held rigidly in engagement with the beam by virtue of the stirrup members 7.

Figure 4:
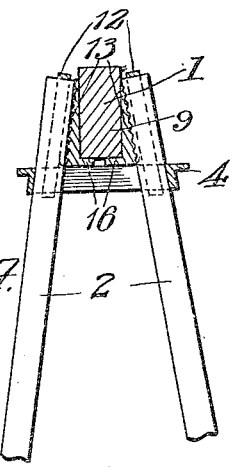
Fig. 4 is an enlarged fragmentary transverse sectional view of the modified form of connecting elements.
Figure 5:
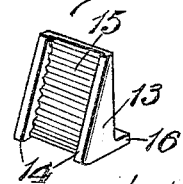
Fig. 5 is an enlarged detailed perspective of a wedge member employed in connection with the modified form of my invention as shown in Fig. 4.

Referring to the modified form of my invention shown in Figs. 4 and 5 the beam has been designated 1 and the legs 2. Of course, only one pair of the legs has been shown in this case, but it is to be understood that the opposite end of the beam 9 is also provided with the same structure as that shown. The yoke member is designated 4 and is practically identical with the yoke member of the preferred form of my invention. The stirrup members are shown and designated 12, being engaged with the yoke member in a manner identical with the preferred form of my invention. However, in order to obviate the necessity of beveling the leg I provide a pair of wedge members 13, one of which is shown to advantage in Fig. 5. The wedge member is provided with side flanges 14, adapted to form a longitudinal recess to receive the upper end of the leg, the surface of the wedge being corrugated as at 15 to prevent slipping of the leg. The lower ends of the wedge member 13 are provided with lateral flanges 16 for engagement beneath the beams. The wedges engage above the yoke members, so that the yoke members assist in retaining the wedges in position.

Figure 6:
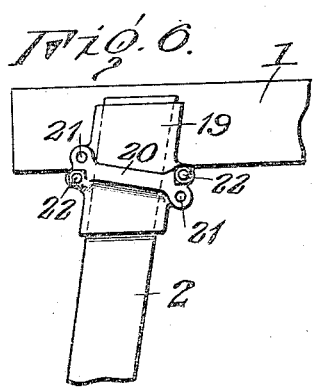
Fig. 6 is an enlarged fragmentary side elevational view of a further modified form of my invention.

In Fig. 6 I have illustrated a further modified form of my invention wherein the beam is designated 1 and one of the legs 2. A clamping block 19 is provided, said clamping block being U-shaped in cross section and having a rib 20 on the outer surface thereof. The free ends of the rib 20 are enlarged and provided with pairs of apertures 21, a certain pair of apertures being adapted to receive bolts 22 when the block is applied to the legs, said bolts passing beneath the beam into a block similar to the block 19, arranged on the opposite side of the beam. The formation of the enlargements and openings permits reversal and interchangeability of the block 19.

Figure 7:
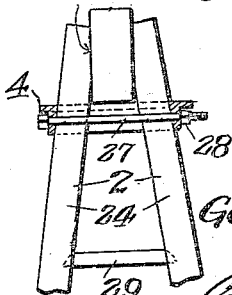
Fig. 7 is an enlarged end elevational view, partly in section, of a still further modified form of my invention.

Referring to Fig. 7, I have illustrated a further modified form of my invention in which the beam is designated 1 and the supporting legs 2. The upper free ends of the legs are beveled as at 25, or may be straight and the wedges 13 employed. A yoke member 4 is provided, said yoke member being practically identical in construction with the yoke members 4 and 11 hereinbefore described. A plurality of bolts 27 extend transversely of the beam beneath the same and through said yoke members retaining the yoke in the desired position, nuts 28 serving to retain said bolts in position. A spreading brace 29 is inserted between the legs 24 to maintain the same in clamped position.

Figure 8:
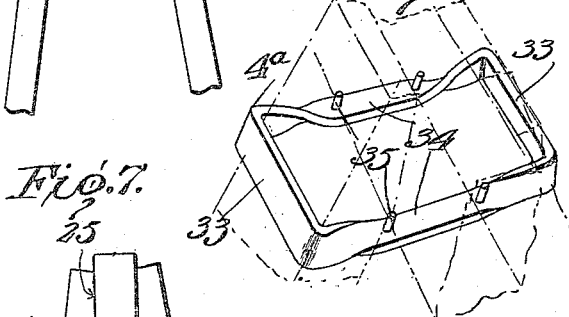
Fig. 8 is a still further modified form of my invention.

Referring to the modified form of my invention shown in Fig. 8 I provide a rectangular yoke 4ª having inclined ends 33 and twisted sides forming saddles 34. A pair of pins 35 are carried by each of the saddle portions to receive a beam, the legs being received between the inclined ends and the beam. The pins prevent lateral displacement of the beam and the inclined ends coöperating with the pins and beam serve to grip the legs.

The use and advantages of my improved support will be readily apparent from the foregoing description and the drawing. It is apparent that in all of the forms of my invention the parts thereof are interchangeable, that is, the yoke members in each form are practically identical and if desired the wedge members may be employed in connection with the form of the invention shown in Figs. 1 to 3 or in connection with the form shown in Fig. 7. I desire to lay particular stress upon the novel manner in which the members may be quickly and easily disassembled when not in use.

From the above description taken in connection with the accompanying drawing, it is thought that a clear and comprehensive understanding of the construction, operation and advantages of my invention may be had, and while I have shown and described the device as embodying a specific structure, I desire that it be understood that such changes may be made in said structure as do not depart from the spirit and scope of the invention as claimed.

Having thus fully described my invention, what I claim as new and desire to secure by Letters Patent, is:

1. The combination with a beam, and supporting legs, of means for connecting said beam and legs including a yoke member to encircle the legs, stirrup members carried by the upper free ends of said legs to engage the yoke member to maintain the same in engagement with said leg and said beam.

2. In a support, the combination of a beam, supporting legs therefor, a yoke member for engagement with said legs, said yoke member being engageable beneath said beam, stirrup members carried by the upper free ends of the legs for engagement with said yoke member to maintain the same in engagement with said beam, and wedge means insertible between the free ends of said legs and said beam to dispose the legs at an angle laterally relative said beam.

In testimony whereof, I affix my signature hereto.

GEORG F. KRIEGER.

Copies of this patent may be obtained for five cents each, by addressing the "Commissioner of Patents, Washington, D. C."